United States Patent
Zhao et al.

(10) Patent No.: US 10,126,444 B2
(45) Date of Patent: Nov. 13, 2018

(54) CALIBRATING GAIN OF SCINTILLATOR DETECTOR

(71) Applicant: Shenyang Neusoft Medical Systems Co., Ltd., Shenyang (CN)

(72) Inventors: Jian Zhao, Shenyang (CN); Nan Li, Shenyang (CN); Guocheng Wu, Shenyang (CN); Baowei Xu, Shenyang (CN); Changqing Fu, Shenyang (CN); Guodong Liang, Shenyang (CN); Donghui Han, Shenyang (CN)

(73) Assignee: Shenyang Neusoft Medical Systems Co., Ltd., Shenyang (CN)

( * ) Notice: Subject to any disclaimer, the term of this patent is extended or adjusted under 35 U.S.C. 154(b) by 0 days.

(21) Appl. No.: 15/262,934

(22) Filed: Sep. 12, 2016

(65) Prior Publication Data

US 2017/0090051 A1 Mar. 30, 2017

(30) Foreign Application Priority Data

Sep. 29, 2015 (CN) .......................... 2015 1 0633963

(51) Int. Cl.
*A61B 6/00* (2006.01)
*G01T 7/00* (2006.01)
(Continued)

(52) U.S. Cl.
CPC ............... *G01T 7/005* (2013.01); *G01T 1/20* (2013.01); *G01T 1/208* (2013.01)

(58) Field of Classification Search
CPC ...... G01T 1/2985; G01T 1/1647; G01T 7/005
See application file for complete search history.

(56) References Cited

U.S. PATENT DOCUMENTS

| 5,677,536 A | 10/1997 | Vickers |
| 2003/0057375 A1* | 3/2003 | Williams ............... G01T 1/208 |
| | | 250/363.09 |

(Continued)

FOREIGN PATENT DOCUMENTS

| AU | 2482097 A | 12/1997 |
| CN | 101292174 A | 10/2008 |

(Continued)

OTHER PUBLICATIONS

Niu, Kenan, et al., "Address Mapping Algorithm and the Design of the LYSO Detector in PET," Beijing Biomedical Engineering; Oct. 2011, vol. 30, No. 5, pp. 484-489.

(Continued)

*Primary Examiner* — Kenneth J Malkowski
(74) *Attorney, Agent, or Firm* — Fish & Richardson P.C.

(57) ABSTRACT

Methods and devices for calibrating a gain of a scintillator detector are disclosed, where a scintillation crystal of the scintillator detector includes two or more energy regions. In an example, the scintillation crystal of the scintillator detector is adopted as a radiation source for calibrating. Electric signals outputted from a rear end of the scintillator detector are collected, and actual counts of the electric signals from each of at least two energy regions of the scintillation crystal at a specified position are obtained, respectively. Then, a gain of the scintillator detector may be adjusted according to the obtained actual counts of the electric signals from the at least two energy regions.

16 Claims, 9 Drawing Sheets

(51) Int. Cl.
*G01T 1/20* (2006.01)
*G01T 1/208* (2006.01)

(56) References Cited

U.S. PATENT DOCUMENTS

| | | | |
|---|---|---|---|
| 2006/0102845 A1* | 5/2006 | Williams | G01T 1/172 |
| | | | 250/363.03 |
| 2008/0251709 A1* | 10/2008 | Cooke | G01T 1/1644 |
| | | | 250/252.1 |
| 2009/0114827 A1 | 5/2009 | Burbar et al. | |
| 2011/0101232 A1 | 5/2011 | Stein | |
| 2014/0110573 A1 | 4/2014 | Wang | |
| 2015/0301201 A1* | 10/2015 | Rothfuss | G01T 1/2985 |
| | | | 250/252.1 |

FOREIGN PATENT DOCUMENTS

| | | |
|---|---|---|
| CN | 101989526 A | 3/2011 |
| CN | 103424768 A | 12/2013 |
| CN | 103675886 A | 3/2014 |
| CN | 104597474 A | 5/2015 |
| CN | 104898159 A | 9/2015 |
| EP | 2354809 A2 | 8/2011 |
| JP | 7-49383 A | 2/1995 |
| WO | 2010053818 A2 | 5/2010 |

OTHER PUBLICATIONS

Conti, Maurizio, et al., "Monitoring Energy Calibration Drift Using the Scintillator Background Radiation," IEEE Transactions on Nuclear Science; Jun. 2011, vol. 58, No. 3; pp. 687-694 (English-language Abstract only; 3 pages).

Knoess, Christof , et al., "Development of a Daily Quality Check Procedure for the High-Resolution Research Tomograph(HRRT) Using Natural LSO Background Radioactivity," IEEE Transactions on Nuclear Science; 2001, vol. 49, No. 5; pp. 2074-2078 (English-language Abstract only; 3 pages).

The State Intellectual Property Office of People's Republic of China; Office Action dated Jul. 21, 2017 in corresponding Chinese Patent Application No. 201510633961X (with English-language Translation).

* cited by examiner

A number of channel addresses

CALIBRATING GAIN OF SCINTILLATOR DETECTOR

CROSS REFERENCE TO RELATED APPLICATIONS

This application claims priority under 35 U.S.C. § 119 to Chinese Patent Application No. 201510633963.X, filed on Sep. 29, 2015. The content of the priority application is hereby incorporated by reference in its entirety.

TECHNICAL FIELD

The present disclosure relates to gain calibration for a scintillator detector.

BACKGROUND

Detectors for observing and recording particles may be divided into scintillator detectors, semiconductor detectors, and other detectors, where scintillator detectors are widely used. A scintillator detector may include a scintillation crystal and a photoelectric conversion element (such as, a photomultiplier tube). The accuracy of a gain of the scintillator detector is affected by a conversion efficiency of the photoelectric conversion element. For the same scintillation crystal, different photoelectric conversion elements may cause different gains. Therefore, calibrating the gain of the scintillator detector may be necessary.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyzer. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

One aspect of the present disclosure features a method of calibrating a gain of a scintillator detector. The method includes collecting electric signals outputted from a rear end of a scintillator detector when a scintillation crystal of the scintillator detector is adopted as a radiation source for calibrating, a background spectrum of the scintillation crystal including two or more energy regions; obtaining actual counts of the electric signals from each of at least two energy regions of the scintillation crystal at a specified position, respectively; and adjusting a gain of the scintillator detector according to the obtained actual counts of the electric signals from the at least two energy regions.

In some implementations, the adjusting a gain of the scintillator detector according to the actual counts of the electric signals from the at least two energy regions includes determining whether a sum of the actual counts of the at least two energy regions is within a threshold range for a sum of reference counts of the at least two energy regions; and in response to a determination of the sum of the actual counts of the at least two energy regions being not within the threshold range, adjusting the gain of the scintillator detector such that the sum of the actual counts of the at least two energy regions is within the threshold range.

The adjusting a gain of the scintillator detector according to the actual counts of the electric signals from the at least two energy regions can further include: in response to a determination of the sum of the actual counts of the at least two energy regions being within the threshold range, determining whether a ratio of the actual counts of the at least two energy regions is consistent with a ratio of the reference counts of the at least two energy regions; and in response to a determination of the ratio of the actual counts being not consistent with the ratio of the reference counts, adjusting the gain of the scintillator detector such that the ratio of the actual counts of the at least two energy regions is consistent with the ratio of the reference counts of the at least two energy regions.

In some implementations, the scintillator detector includes a plurality of scintillation crystals positioned on a front end of the scintillator detector and configured to receive nuclear radiation, each of the scintillation crystals having two or more energy regions; and a plurality of photoelectric convertor positioned on the rear end of the scintillator detector and configured to match with the plurality of scintillation crystals and obtain corresponding electric signals for the plurality of scintillation crystals.

The method can further include: determining a crystal position corresponding to each of the collected electric signals which are outputted from the rear end of the scintillator detector, where the specified position is the determined crystal position for the scintillation crystal. The method can also include adjusting the gain of the scintillator detector according to obtained actual counts of electric signals from at least two energy regions of a second scintillation crystal of the plurality of scintillation crystals at a second determined crystal position for the second scintillation crystal.

The scintillation crystal of the scintillator detector can have a long-life background radioactivity. In a particular example, the scintillation crystal includes a Lutetium-yttrium oxyorthosillicate Crystal. Each energy region of the background spectrum of the scintillation crystal can include one or more single-channel sections, and each of the single-channel sections can include at least one channel address. The at least two energy regions of the scintillation crystal at the specified position can include at least two single-channel sections of the scintillation crystal, and each of the at least two single-channel sections can belong to a respective, different energy region.

Another aspect of the invention features a device for calibrating a gain of a scintillator detector. The device includes a processor which invokes machine readable instructions corresponding to a control logic for calibrating a gain of a scintillator detector stored on a storage medium and executes the machine readable instructions to: collect electric signals outputted from a rear end of the scintillator detector when a scintillation crystal of the scintillator detector is adopted as a radiation source for calibrating, a background spectrum of the scintillation crystal including two or more energy regions; obtain actual counts of the electric signals from each of at least two energy regions of the scintillation crystal at a specified position, respectively; and adjust a gain of the scintillator detector according to the actual counts of the electric signals from the at least two energy regions.

For adjusting a gain of the scintillator detector according to the actual counts of the electric signals from the at least two energy regions, the machine readable instructions can further cause the processor to: determine whether a sum of the actual counts of said at least two energy regions is within a threshold range for a sum of reference counts of said at least two energy regions; and in response to a determination of the sum of the actual counts of the at least two energy regions being not within the threshold range, adjust the gain of the scintillator detector such that the sum of the actual counts of the at least two energy regions is within the threshold range.

In some cases, for adjusting a gain of the scintillator detector according to the actual counts of the electric signals from the at least two energy regions, the machine readable instructions further cause the processor to: in response to a determination of the sum of the actual counts of the at least two energy regions being within the threshold range, determine whether a ratio of the actual counts of the at least two energy regions is consistent with a ratio of the reference counts of the at least two energy regions; and in response to a determination of the ratio of the actual counts is not consistent with the ratio of the reference counts, adjust the gain of the scintillator detector such that the ratio of the actual counts of the at least two energy regions is consistent with the ratio of the reference counts of the at least two energy regions.

The scintillation crystal of the scintillator detector can have a long-life background radioactivity. In a particular example, the scintillation crystal includes a Lutetium-yttrium oxyorthosillicate Crystal. Each energy region of the background spectrum of the scintillation crystal can include one or more single-channel sections, and each of the single-channel sections can include at least one channel address. The at least two energy regions of the scintillation crystal at the specified position can include at least two single-channel sections of the scintillation crystal, and each of the at least two single-channel sections can belong to a respective, different energy region.

In some implementations, the scintillator detector includes a plurality of scintillation crystals positioned on a front end of the scintillator detector and configured to receive nuclear radiation, each of the scintillation crystals having two or more energy regions; and a plurality of photoelectric convertor positioned on the rear end of the scintillator detector and configured to match with the plurality of scintillation crystals and obtain corresponding electric signals for the plurality of scintillation crystals.

The machine readable instructions can further cause the processor to: determine a crystal position corresponding to each of the collected electric signals which are outputted from the rear end of the scintillator detector, wherein the specified position is the determined crystal position for the scintillation crystal. In some cases, the machine readable instructions further cause the processor to: adjust the gain of the scintillator detector according to obtained actual counts of electric signals from at least two energy regions of a second scintillation crystal of the plurality of scintillation crystals at a second determined crystal position for the second scintillation crystal.

The details of one or more embodiments of the subject matter described in the present disclosure are set forth in the accompanying drawings and description below. Other features, aspects, and advantages of the subject matter will become apparent from the description, the drawings, and the claims.

BRIEF DESCRIPTION OF DRAWINGS

Features of the present disclosure are illustrated by way of example and not limited in the following figures, in which like numerals indicate like elements, in which.

DETAILED DESCRIPTION

Figure 1:
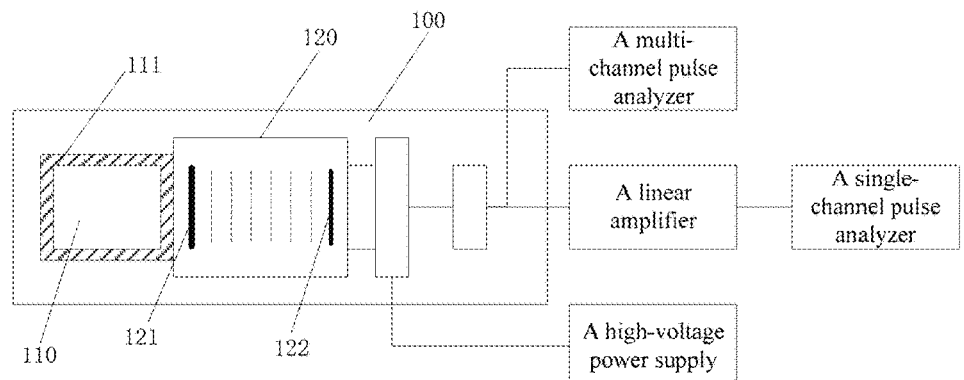
FIG. 1 is an architecture diagram of a scintillator detector.

FIG. 1 is an architecture diagram of a scintillator detector. As shown in FIG. 1, a scintillator detector 100 may include a scintillation crystal 110 and a photoelectric conversion element 120 (such as, a photomultiplier tube). The scintillation crystal 110 is a key component of the scintillator detector 100, and it is also an important factor in determining the quality and grade of the scintillator detector 100. For example, the material, volume and shape of the scintillation crystal 110 affect the performance of the scintillator detector 100 greatly. For the scintillation crystal 110 with a certain material, there may be an optimal volume or shape to optimize the spatial resolution of the scintillator detector 100.

As shown in FIG. 1, the scintillation crystal 110 may include a reflecting layer 111, and the photoelectric conversion element 120 may include a photocathode 121 and an anode 122. In an example, the scintillator detector 100 may further include other electronic equipment, such as a linear amplifier, a single-channel pulse analyzer, a multi-channel pulse analyzer, and/or a high-voltage power supply, etc. In some cases, the linear amplifier can be used to adjust a gain of the scintillator detector 100. For example, the linear amplifier may be a variable gain amplifier (VGA) to adjust a gain of the scintillator detector 100.

The working process of the scintillator detector 100 may be divided as follows: interactions between nuclear radiation and the scintillation crystal 110 will cause the scintillation crystal to ionize, excite, and emit fluorescence; a light collector composed of a light guide and a reflector projects photons onto the photocathode 121 of the photoelectric conversion element 120 to hit photoelectrons; and the photoelectrons are multiplied and accelerated in the photoelectric conversion element 120 to form a current pulse at the anode 122. A height of the current pulse can be proportional to ray energy, and a number of the current pulses (i.e., a count) can be proportional to a number of photons incident from the radiation source to the scintillation crystal, that is, it's proportional to a radiation activity.

The accuracy that the scintillator detector 100 obtains the current pulse signal is affected by the conversion efficiency of the photoelectric conversion element 120. For example, even if the ray energies received by the scintillation crystal 110 (acted as a front end of the scintillator detector 100) are the same, different photoelectric conversion elements 120 (acted as a rear end of the scintillator detector 100) may also obtain current pulse signals with different energies. Therefore, calibrating a gain of the scintillator detector 100 is desirable.

A method of calibrating a gain of a scintillator detector is provided in the present disclosure. The method of calibrating a gain may adopt counts of electric signals from at least two energy regions to perform calibration. For example, a background spectrum of a radiation source adopted by the method of calibrating a gain of the present disclosure may include two or more energy regions, such that it is possible to emit at least two radiation rays with different energies.

Be noted that, the radiation source may be an external radiation source. In an example, in a case a scintillation crystal of the scintillator detector has a long-life background radioactivity and is able to emit at least two radiation rays with different energies, the radiation source adopted by the method of calibrating a gain of the present disclosure may be the scintillation crystal of the scintillator detector.

In this example of the present disclosure, the term "long-life background radioactivity" means that the scintillation crystal has a stable background radioactivity within a usable time of the scintillator detector.

Due to the background radioactivity of the scintillation crystal, the scintillation crystal may be directly adopted as the radiation source to replace the commonly-used external radiation source for calibrating. Because the scintillator detector adopts its own scintillation crystal as the radiation source for calibration, the scintillator detector does not need to be specially designed based on calibration requirements, such that a motif system can be saved. Where, the motif system may be used to provide radiation for calibrating in a case the scintillation crystal in the scintillator detector is not used as the radiation source for calibration. For example, the motif system may comprise a radioactive rod source or a motif injected with radioactive liquid.

In a case that the scintillator detector adopts its own scintillation crystal as the radiation source, the scintillation crystal may have a uniform size in order to facilitate the calculation of its volume. In another example, although the shape of the scintillation crystal is irregular, its volume is known and fixed.

Be noted that, the method of calibrating a gain of a scintillator detector provided in the example(s) of the present disclosure is not limited by the type of the photoelectric conversion element. For example, the method of calibrating a gain may be applied to a photomultiplier tube (PMT), and it may also be applied to a Silicon Photomultiplier (SiPM).

In a specific example of the present disclosure, the scintillation crystal of the scintillator detector may be a Lutetium-yttrium oxyorthosilicate Crystal, namely a LYSO crystal. Compared with NaI (TI) (Sodium Iodide (Thallium Activated)) and BGO (Bismuth Germanium Oxide), the LYSO crystal has advantages including high light output, fast luminescence decay, more effective atomic number, high density, stable physical and chemical properties, non-deliquescence, and high detection efficiency for γ-ray, and it may be considered as an inorganic scintillation crystal material with a better overall performance and may be acted as the scintillation crystals used in SPECT (Single-Photon Emission Computed Tomography) and PET (Positron Emission Tomography).

The LYSO crystal has a natural radioactive background. During the growth process of the LYSO crystal, the radioactivity of the $^{176}$Lu element (used as a composite element of the LYSO crystal) cannot be removed, which may inevitably affect the natural radioactive background of the LYSO crystal. However, the performance (such as, the activity energy) of the radioactive background of the LYSO crystal is stable, such as its half-life is approximately $3.8*10^{10}$ years, and thus it can be regarded as a fixed parameter with respect to the product life cycle.

Figure 2A:
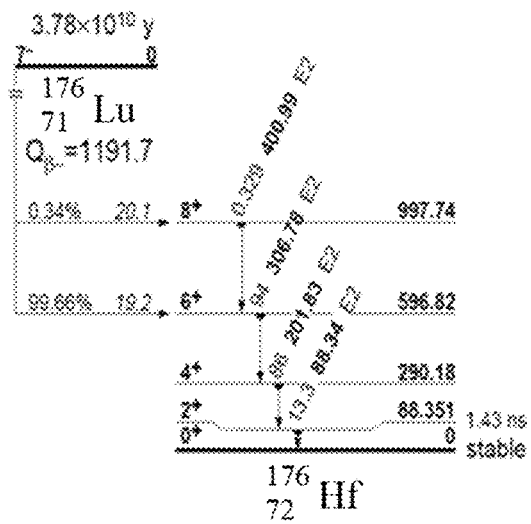
FIG. 2A is a decay scheme of $^{176}$Lu element.
Figure 2B:
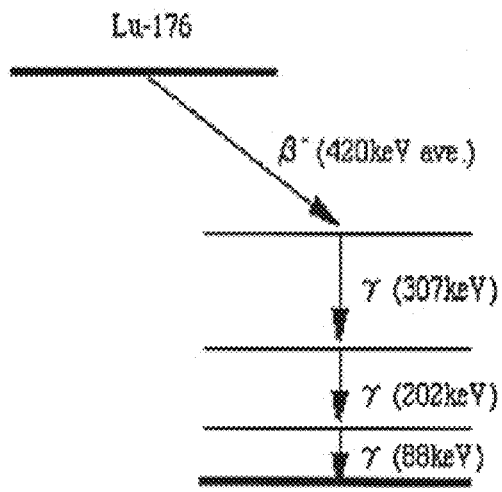
FIG. 2B is an energy diagram corresponding to energy levels of decay of the $^{176}$Lu element.

The $^{176}$Lu element has its own natural background radioactivity, and the performance of its radioactivity is that β decay accompanied with corresponding γ decay. FIG. 2A is a decay scheme of the $^{176}$Lu element, and FIG. 2B is an energy diagram corresponding to energy levels of the decay of the $^{176}$Lu element. As can be seen from FIG. 2B, the energy of the occurrence of β decay is 420 keV, and the energies of the occurrences of corresponding γ decay are 307 keV, 202 keV, and 88 keV, respectively.

Figure 3:
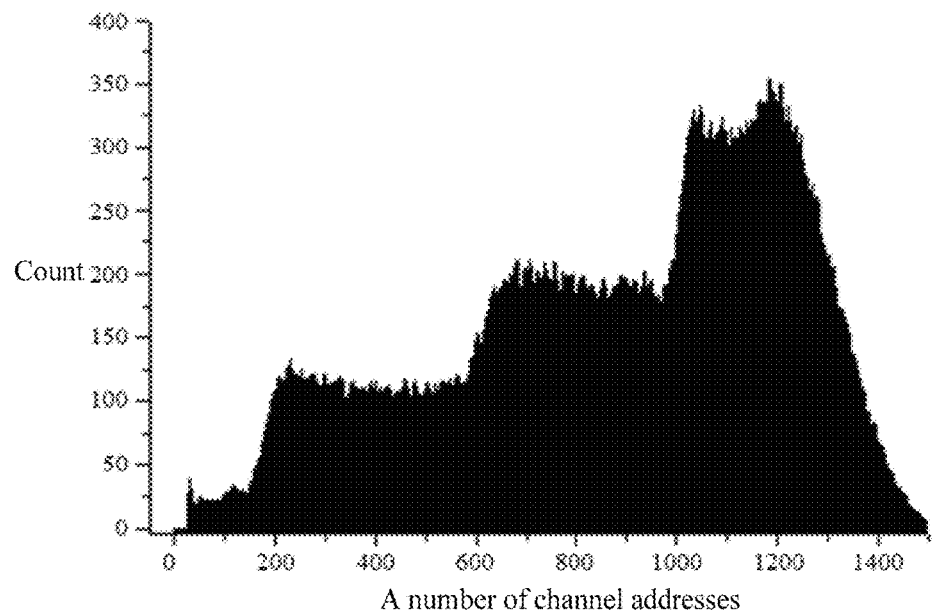
FIG. 3 is an actually-measured background spectrum diagram of the $^{176}$Lu element of an LYSO crystal.

FIG. 3 is an actually-measured background spectrum diagram of the $^{176}$Lu element of a LYSO crystal. As can be seen from FIG. 3, the four energy peaks of the background decay of the $^{176}$Lu element have a stepped distribution, and there is a certain incremental relationship between the energy peaks and a ratio between the energy peaks is constant. Thus, calibrating a gain of the scintillator detector may be performed according to this rule, e.g., the relationship and/or the ratio. Since the electric signals carry radiation energy information for calibrating a gain of the scintillator detector, in order to overcome the $^{176}$Lu element's defect of having a poor background energy resolution, counts from different energy regions corresponding to the background energies of the $^{176}$Lu element may be adopted for calibrating a gain. In this example of the present disclosure, calibrating a gain of the scintillator detector is performed based on the counts of the electric signals from different energy regions corresponding to the background energies of the $^{176}$Lu element.

Figure 4:
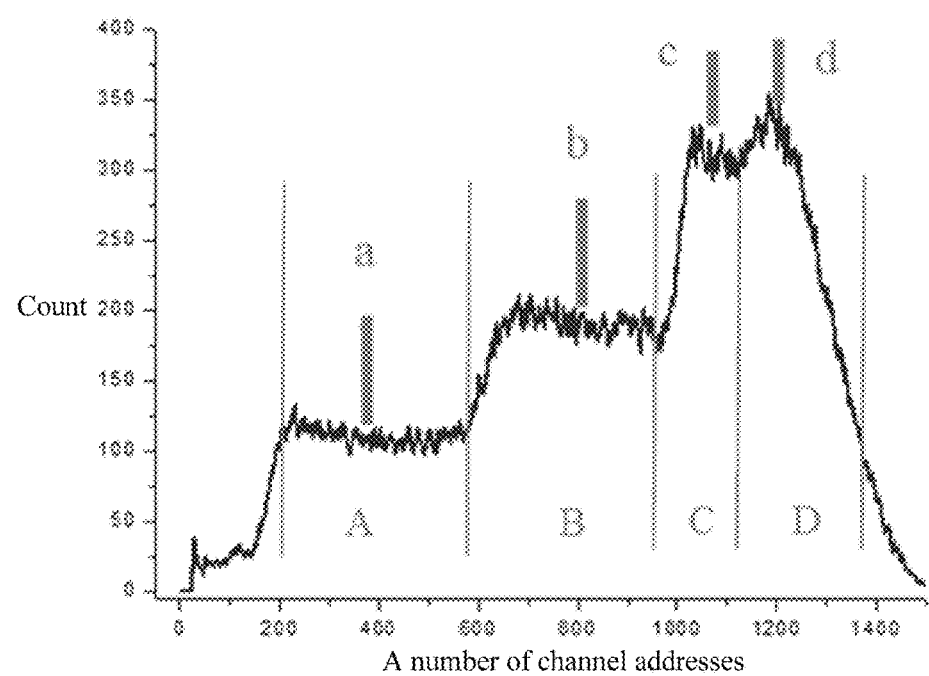
FIG. 4 is a diagram for energy regions and single-channel sections of an LYSO crystal.

The background spectrum of the LYSO crystal may be split into four different energy regions, which is shown in FIG. 4. The four different energy regions are marked as A, B, C, and D, respectively. As can be seen from FIG. 4, the four different energy regions A, B, C, and D of the background spectrum of the LYSO crystal correspond to one β decay and three γ decay of the $^{176}$Lu element, respectively. Since the $^{176}$Lu element has a long half-life, the total counts of different rays are relatively stable during the decay process of the $^{176}$Lu element, and the ratio between the counts of the electric signals from different rays may remain fixed. Hence, the counts of the electric signals from energy regions and the ratio between the counts of the electric signals from different energy regions may be used for calibrating a gain of the scintillator detector.

As can be seen from FIG. 4, each of the energy regions is an energy section formed by different channel addresses. In the example of the present disclosure, besides adopting the counts of the entire energy region for calibrating a gain, the count of the energy region having a smaller single-channel section may be adopted for calibrating a gain in order to simplify the statistics of the counts. It should be noted that the corresponding single-channel section of each energy region in the example of the present disclosure may be a section segment of the entire energy region, that is, the single-channel section includes a plurality of sections composed of continuous channel addresses, and a number of the channel addresses of the single-channel section is less than a number of the channel addresses of its corresponding energy region. For example, in a case an energy region is an energy section composed of the $200^{th}$ to the $300^{th}$ channels, the single-channel section may be composed of the $230^{th}$ to the $240^{th}$ channels. In an example of the present disclosure, the corresponding single-channel section of each energy region may be a single channel address of the energy region, that is, each single-channel section includes a single channel address, such as the $300^{th}$ channel. Overall, in the examples of the present disclosure, the single-channel section includes at least one channel address.

In a specific example of the present disclosure, as shown in FIG. 4, four single-channel sections a, b, c, and d (each of them includes 10 channel addresses) may be selected from the four different energy regions A, B, C and D of the LYSO crystal, respectively. As shown in FIG. 4, the corresponding channel address section of the four energy regions A, B, C and D may be [200-600], [600-1000], [1000-1100], and [1100-1280], respectively. For example, the corresponding channel address section of the four single-channel sections a, b, c and d may be [300-310], [850-860], [1050-1060], and [1250-1260], respectively.

It should be noted that the single-channel sections a, b, c and d shown in FIG. 4 are merely an example, and the single-channel sections adopted in the example of the present disclosure are not limited to the example shown in FIG. 4, and can be other single-channel sections composed of other channel addresses and/or other number of channel addresses.

As described above, since the $^{176}$Lu element of the LYSO crystal has a long half-life, the counts of different rays are relatively stable during the decay process of the $^{176}$Lu element, and the ratio between the counts of different rays may remain fixed. Hence, the above-described rule may be used for calibrating a gain of the scintillator detector. As an example of the present disclosure, as shown in FIG. 4, corresponding reference counts $RC_a$, $RC_b$, $RC_c$ and $RC_d$ of the four single-channel sections a, b, c and d may be 50 cps, 100 cps, 150 cps, and 160 cps, respectively, wherein cps is the unit of the counts, which represents the number of counts per second. The ratio between the reference counts of the four single-channel sections a, b, c and d is that: $RC_a:RC_b:RC_c:RC_d=1:2:3:3.2$.

It should be noted that the above-described reference counts and the ratio between the reference counts are merely an example, and different values may be adopted in practical applications. Since the background radioactivity of the LYSO crystal naturally exists and the content of each substance is fixed, the reference count of each single-channel section may be a substantially fixed value. Under the condition that the gain of the scintillator detector is consistent, the reference count of each single-channel section may be substantially fixed. Generally, the reference count of each single-channel section may be obtained through experiments in advance under the condition that the gain of the photoelectric conversion element (e.g., a PMT) is consistent.

Regardless of the gain of the scintillator detector is appropriate, its measured background spectrum diagram may be substantially as shown in FIG. 3. For example, in a case the gain is small, the background spectrum diagram shown in FIG. 3 may be zoomed out leftward; and in a case the gain is large, the background spectrum diagram shown in FIG. 3 may be zoomed in rightward. In the example of the present disclosure, a gain of the scintillator detector is calibrated based on the above-described principle.

Besides the LYSO crystal may be adopted as the scintillation crystal of the scintillator detector, other scintillation crystals having a background radioactivity, such as Barium Fluoride, may be adopted in the example of the present disclosure.

In the following examples, the Lutetium-yttrium oxyorthosillicate Crystal (i.e., the LYSO crystal) is adopted as the scintillation crystal, so as to describe specific implementations of the method of calibrating a gain of the scintillator detector provided in the present disclosure.

In the $1^{st}$ example, the counts of two single-channel sections may be adopted for calibrating a gain of the scintillator detector. Assuming that two single-channel sections are the single-channel sections a and b, respectively. Be noted that, in a case the counts of two single-channel sections of a plurality of energy regions are adopted for calibrating a gain of the scintillator detector, these two single-channel sections may be any two single-channel sections of any two energy regions, and are not limited to the single-channel sections a and b in the $1^{st}$ example. However, for a detector with a fixed structure, the single-channel sections adopted must be fixed single-channel sections during the same calibration process, and should not be changed during the calibration process.

Figure 5:
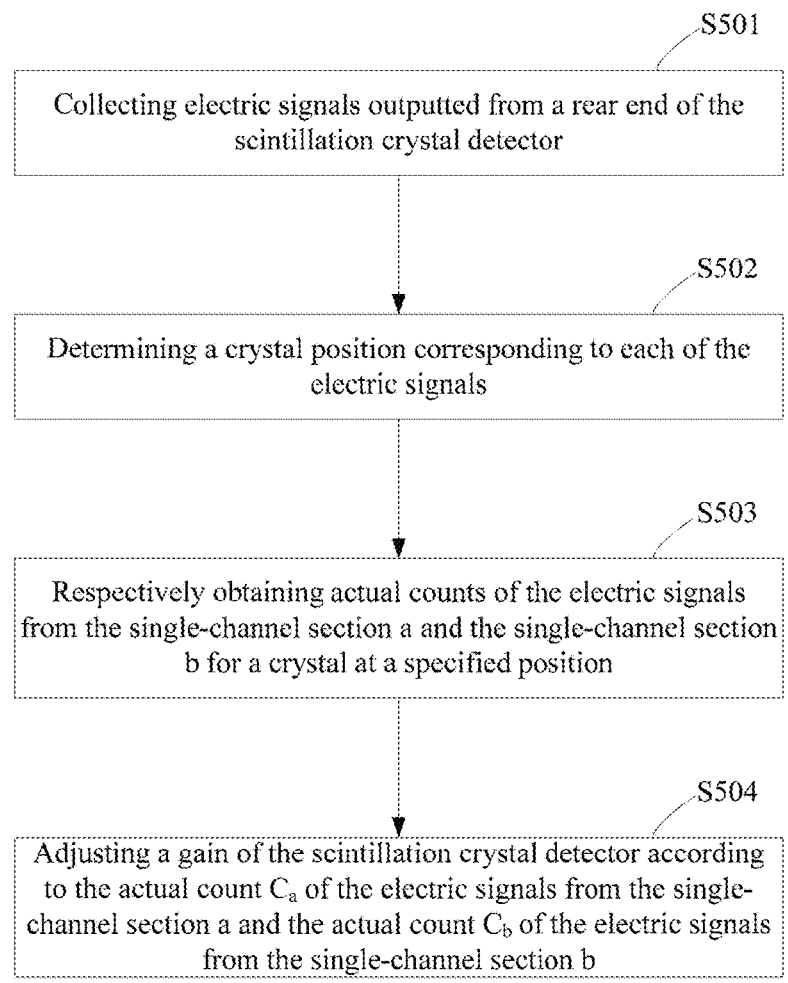
FIG. 5 is a flowchart illustrating procedures of a method of calibrating a gain of a scintillator detector according to a $1^{st}$ example of the present disclosure.

FIG. 5 is a flowchart illustrating the procedures of a method of calibrating a gain of a scintillator detector according to a $1^{st}$ example of the present disclosure. As shown in FIG. 5, the method for calibrating a gain may include the following blocks S501-S504.

At block S501, electric signals outputted from a rear end of the scintillator detector are collected.

In a case the rays are incident on the scintillation crystal, it is marked as a calibration event. After the calibration event is converted through a photoelectric conversion element of the scintillator detector, the electric signals corresponding to the calibration events may be obtained at the rear end of the scintillator detector. Be noted that, the electric signals collected may be electric pulse signals.

The electric signals collected may contain energy information for exciting photons and crystal position information corresponding to the electric signals.

Be noted that, during the calibration process, each of collecting times should be the same and adequate total counts should be guaranteed.

At block S502, a crystal position corresponding to each of the electric signals is determined.

Be noted that, the electric signal is from an average of one or more scintillation crystals corresponding to a photoelectric conversion element. In a case the scintillator detector adopts a photoelectric conversion element corresponding to a scintillation crystal, this block S502 may be omitted. In this case, the position of each photoelectric conversion element itself represents the crystal position.

However, under normal circumstances, in order to save photoelectric conversion elements, the scintillator detector may adopt a few photoelectric conversion elements to match with dozens of scintillation crystals, and the electric signals at the rear end may adopt gravity method to restore position information or other information of original signals through splitting effects of light guides. For example, in a case the scintillator detector adopts a few photoelectric conversion elements to match with dozens of scintillation crystals, a crystal position corresponding to each of the electric signals may need to be determined.

Figure 7:
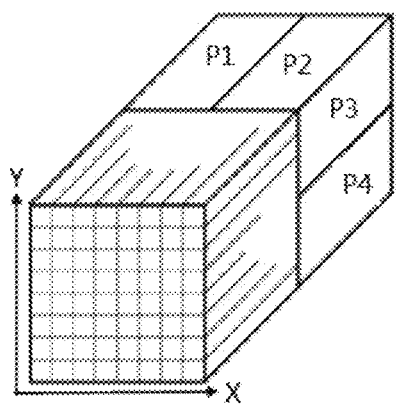
FIG. 7 is an architecture diagram of a scintillator detector which is designed based on the center of gravity.
Figure 8:
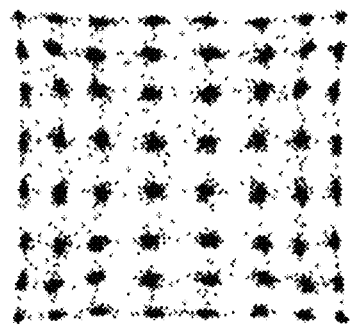
FIG. 8 is a two-dimensional position scatter diagram of a crystal array of a radiation source.

In the following description, how to determine a crystal position corresponding to each of the electric signals is introduced. FIG. 7 is an architecture diagram of a scintillator detector which is designed based on the center of gravity. As shown in FIG. 7, a scintillator detector is composed of four PMT tubes and a crystal block containing multiple internally-engraved grooves with different depths, wherein these four PMT tubes may be marked as P1, P2, P3 and P4, respectively. If the rays incident on the crystal block excite visible lights, due to the effect of grooves, the visible lights arrive these four PMT tubes P1, P2, P3 and P4 in accordance with a certain ratio, and then the visible lights are multiplied and converted into electric signals. The electric signals outputted from these four PMT tubes P1, P2, P3 and P4 may be denoted as $I_{P1}$, $I_{P2}$, $I_{P3}$ and $I_{P4}$, respectively. The position coordinates X and Y that the rays are incident on the crystal block may be obtained according to the gravity method, which can be used for determining the ray is incident from which crystal bar. FIG. 8 is a two-dimensional position scatter diagram of a crystal array of a radiation source. By using the scatter diagram, the crystal position information corresponding to the electric signals may be determined, wherein the electric signals outputted from these four PMT tubes P1, P2, P3 and P4 may be denoted as $I_{P1}$, $I_{P2}$, $I_{P3}$ and $I_{P4}$, respectively.

The position coordinates X and Y may be calculated and obtained according to the following equations.

$$E = I_{P1} + I_{P2} + I_{P3} + I_{P4} \quad (1)$$

$$X = \frac{I_{P1} + I_{P2} - I_{P3} - I_{P4}}{E} \quad (2)$$

$$Y = \frac{I_{P1} + I_{P3} - I_{P2} - I_{P4}}{E} \quad (3)$$

The energies of a crystal from different positions received by the PMT tubes are different due to the structure of the scintillator detector, the crystal peaks at the same position corresponding to each of the PMT tubes may be adopted for counting in order to obtain the count information more accurately.

At block S503, actual counts of the electric signals from the single-channel section a and the single-channel section b for a crystal at a specified position are respectively obtained.

According to a specific example, at the block S503, the actual count $C_a$ of the electric signals from the single-channel section a and the actual count $C_b$ of the electric signals from the single-channel section b for a crystal at a specified position may be respectively obtained.

Since the corresponding incident rays energy may be obtained according to the electric signals, it is able to obtain the corresponding single-channel section. In a case the electric signal corresponds to a certain single-channel section, the counts of the single-channel section are added one. Hence, the actual counts $C_a$ and $C_b$ of the electric signals from the single-channel sections a and b for a crystal at a specified position may be respectively obtained. The specified position is the determined crystal position for the crystal.

At block S504, a gain of the scintillator detector is adjusted according to the actual count $C_a$ of the electric signals from the single-channel section a and the actual count $C_b$ of the electric signals from the single-channel section b.

Be noted that, this block S504 may be performed for two or more crystals, e.g., all crystals, with known positions one by one.

Figure 6:
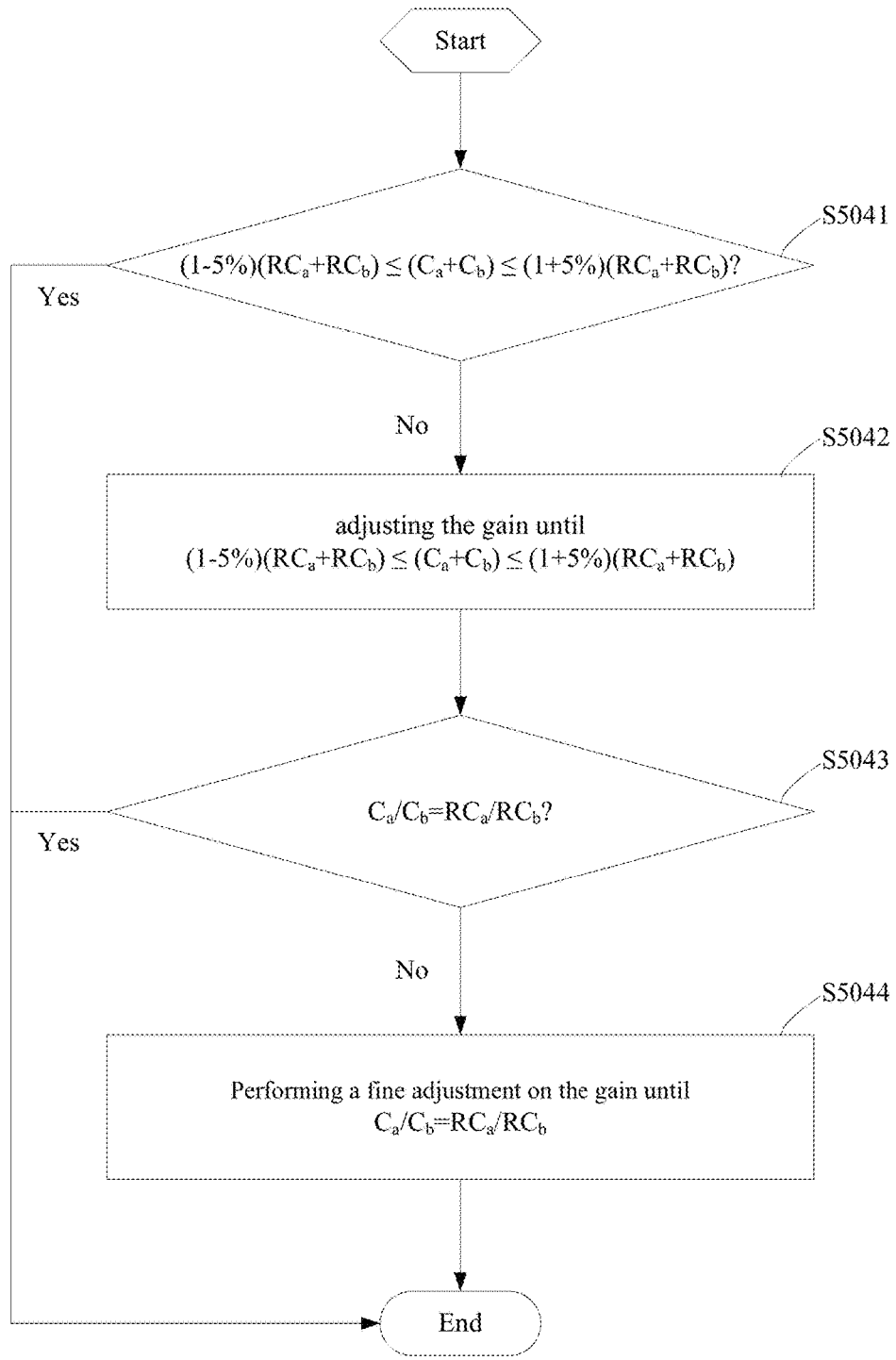
FIG. 6 is a flowchart illustrating a specific implementation of block S504 shown in FIG. 5.

As a specific example of the present disclosure, the specific implementation of the block S504 may be shown in FIG. 6, which may include the following blocks S5041-S5042.

At block S5041, whether a sum of the actual count $C_a$ of the electric signals from the single-channel section a and the actual count $C_b$ of the electric signals from the single-channel section b is within a threshold range for a sum of reference counts of the electric signals from the single-channel sections a and b is determined. If yes, it means that the current gain may be appropriate, so that the actual counts of the electric signals is within an acceptable range and gain adjustment is not required. If no, then go to the block S5042.

It should be noted that the threshold range for the sum of the reference counts of the electric signals from the single-channel sections a and b may be determined according to the reference counts $RC_a$ and $RC_b$ of the electric signals from the single-channel sections a and b. Under normal circumstances, the threshold range for the sum of the reference counts $RC_a$ and $RC_b$ of the electric signals from the single-channel sections a and b may be a range obtained based on the sum of the reference counts $RC_a$ and $RC_b$ of the electric signals from the single-channel sections a and b plus or minus (+/−) a certain floating extent. In this example, the certain floating extent may be 5%. At this time, the threshold range for the sum of the reference counts of the electric signals from the single-channel sections a and b may be $(1\pm5\%)(RC_a+RC_b)$.

At block S5042, the gain of the scintillator detector is adjusted until the sum of the actual counts of the electric signals from the single-channel sections a and b is within the threshold range for the sum of the reference counts of the electric signals from the single-channel sections a and b.

In an example, in a case the sum of the actual count $C_a$ of the electric signals from the single-channel section a and the actual count $C_b$ of the electric signals from the single-channel section b is smaller than a lower limit of the threshold range for the sum of the reference counts of the electric signals from the single-channel sections a and b (i.e., $(C_a+C_b)<(1-5\%)(RC_a+RC_b)$), the gain may be increased by the linear amplifier in FIG. 1 in accordance with a count-based gain adjustment table until the sum of the actual counts $C_a$ and $C_b$ of the electric signals from the single-channel sections a and b is within the threshold range for the sum of the reference counts $RC_a$ and $RC_b$ of the electric signals from the single-channel sections a and b.

In another example, in a case the sum of the actual count $C_a$ of the electric signals from the single-channel section a and the actual count $C_b$ of the electric signals from the single-channel section b is greater than an upper limit of the threshold range for the sum of the reference counts of the electric signals from the single-channel sections a and b (i.e., $(C_a+C_b)>(1+5\%)(RC_a+RC_b)$), the gain may be decreased by the linear amplifier in FIG. 1 in accordance with a count-based on gain adjustment table until the sum of the actual counts $C_a$ and $C_b$ of the electric signals from the single-channel sections a and b is within the threshold range for the sum of the reference counts $RC_a$ and $RC_b$ of the electric signals from the single-channel sections a and b.

In another example, in a case the sum of the actual count $C_a$ of the electric signals from the single-channel section a and the actual count $C_b$ of the electric signals from the single-channel section b is within the threshold range for the sum of the reference counts of the electric signals from the single-channel sections a and b (i.e., $(1-5\%)(RC_a+RC_b) \le (C_a+C_b) \le (1+5\%)(RC_a+RC_b)$), the actual counts of the electric signals are within an acceptable range, so the gain of the scintillator detector won't be adjusted.

Be noted that, the count-based gain adjustment table of the scintillator detector may be obtained from experiments. Different types of scintillator detectors may have different count-based gain adjustment tables. According to an example of the present disclosure, the count-based gain adjustment table of the scintillator detector may be shown as Table-1 below.

TABLE 1

The count-based gain adjustment table

| $((RC_a + RC_b) - (C_a + C_b))/(RC_a + RC_b)$ | | | | | | |
|---|---|---|---|---|---|---|
| | ... | −10% | −5% | 0 | 5% | 10% | ... |
| Gain Adjustment Ratio | ... | −10% | −3% | 0 | 3% | 10% | ... |

Be noted that, the reference count and the gain adjustment ratio shown in Table-1 are usually associated with many factors of the scintillator detector, such as a crystal size, a coupling scheme, and/or a photoelectric conversion element. Therefore, different types of scintillator detectors may have different count-based gain adjustment tables. However, if the structure of the scintillator detector is fixed, its corresponding count-based gain adjustment table is usually fixed. In an example, the gain adjustment ratio shown in Table-1 may be an experimental value obtained by performing experiments. Thereafter, the experimental value may be used as a reference for calibrating a gain on the same type of scintillator detector.

Be noted that, the rough adjustment for the gain of the scintillator detector may be substantially realized by the blocks S5041 and S5042. In order to make the corrected gain of the scintillator detector more accurately, the method for calibrating a gain in the example of the present disclosure may further perform a fine adjustment based on the result of above-described rough adjustment. In this case, the block S504 may further include the blocks S5043-S5044 below.

At block S5043, in a case the sum of the actual counts of the electric signals from the single-channel sections a and b is within the threshold range for the sum of the reference counts of the electric signals from the single-channel sections a and b, whether a ratio between the actual count $C_a$ of the electric signals from the single-channel section a and the actual count $C_b$ of the electric signals from the single-channel section b is consistent with a ratio between the reference count $RC_a$ of the electric signals from the single-channel section a and the reference count $RC_b$ of the electric signals from the single-channel section b (hereinafter is referred to as a reference count ratio) is determined. If yes, it means that the current gain may be appropriate, so that gain adjustment is not required. If no, then go to the block S5044.

At block S5044, a fine adjustment is performed on the gain of the scintillator detector until the ratio of the actual counts of the electric signals from the single-channel sections a and b is consistent with the ratio of the reference counts of the electric signals from the single-channel sections a and b.

For example, in a case $C_a/C_b < RC_a/RC_b$, the gain of the scintillator detector may be increased until the ratio $C_a/C_b$ of the actual counts of the electric signals from the single-channel sections a and b is consistent with the ratio $RC_a/RC_b$ of the reference counts of the electric signals from the single-channel sections a and b.

On the other hand, in a case $C_a/C_b > RC_a/RC_b$, the gain of the scintillator detector may be decreased until the ratio $C_a/C_b$ of the actual counts of the electric signals from the single-channel sections a and b is consistent with the ratio $RC_a/RC_b$ of the reference counts of the electric signals from the single-channel sections a and b.

In another example, in a case $C_a/C_b = RC_a/RC_b$, it means that the current gain is appropriate, so that gain adjustment for the scintillator detector is not required.

According to an example of the present disclosure, the count-ratio-based gain adjustment table of the scintillator detector may be shown as Table-2 below.

TABLE 2

The count-ratio-based gain adjustment table

| RCa/RCb − Ca/Cb | | | | | | |
|---|---|---|---|---|---|---|
| | ... | −⅓ | −¼ | 0 | ¼ | ⅓ | ... |
| Gain Adjustment Ratio | ... | −10% | −3% | 0 | 3% | 10% | ... |

Be noted that, the count ratio and the gain adjustment ratio shown in Table-2 are usually associated with many factors of the scintillator detector, such as a crystal size, a coupling scheme, and/or a photoelectric conversion element. Therefore, different types of scintillator detectors may have different count-ratio-based gain adjustment tables. However, if the structure of the scintillator detector is fixed, its corresponding count-ratio-based gain adjustment table is usually fixed. In an example, the gain adjustment ratio shown in Table-2 may be an experimental value obtained by performing experiments. Thereafter, the experimental value may be used as a reference for calibrating a gain on the same type of scintillator detector.

Above is a specific embodiment of a method of calibrating a gain of a scintillator detector provided in the $1^{st}$ example of the present disclosure.

Be noted that, the counts of two single-channel sections are adopted in the method for calibrating a gain mentioned in the $1^{st}$ example. In practice, as an extension of the example of the present disclosure, the counts of two energy regions may be adopted in the method of calibrating a gain. For example, the counts of the two energy regions A and B may be adopted in the method of calibrating a gain. The method adopting the counts of two energy regions for calibrating is similar to the method adopting the counts of two single-channel sections for calibrating, wherein the above-described two single-channel sections may be accordingly replaced with the two energy regions.

Be noted that, the method of calibrating a gain provided in the examples of the present disclosure is not limited to the above-described single-channel sections a and b or the energy regions A and B. In practice, for the LYSO crystal, any two energy regions among the four energy regions of the LYSO crystal or any two single-channel sections of any two energy regions among the four energy regions of the LYSO crystal may be selected for achieving the purpose of calibrating a gain of the scintillator detector.

The counts of the electric signals from at least two energy regions are adopted in the method of calibrating a gain of a scintillator detector provided in the present disclosure for calibrating a gain of the scintillator detector. Only the sum of the counts from at least two energy regions or from at least two single-channel sections is calculated in the method for calibrating a gain, or the count ratio between said at least two energy regions or said at least two single-channel section is calculated, and thus the algorithm of the method for calibrating a gain is simple.

The embodiment utilizes the background radioactivity of the $^{176}$Lu element of the LYSO crystal and the counts of the two single-channel sections a and b of the background spectrum for calibrating. In the method of calibrating a gain, the LYSO crystal may be used as the radiation source for calibrating, such that the external radiation source and a motif system can be saved. Additionally, in the method of calibrating a gain, the scintillator detector does not need to be specially designed. Where, the motif system may be used to provide radiation for calibrating in a case the scintillation crystal in the scintillator detector is not used as the radiation source for calibration. For example, the motif system may comprise a radioactive rod source or a motif injected with radioactive liquid.

Be noted that, the scintillator detector provided in the example of the present disclosure may be a PET detector in medical image processing field. In a case the scintillator detector is a PET detector, the method of calibrating a gain above may be used for PET image processing, which may be beneficial to improve the PET image quality.

Be noted that, the counts of two single-channel sections are used for calibrating in the example above. In practice, the counts of three or more single-channel sections may be adopted for calibrating in the method for calibrating a gain provided in the example of the present disclosure. Please refer to a $2^{nd}$ example for details.

Figure 9:
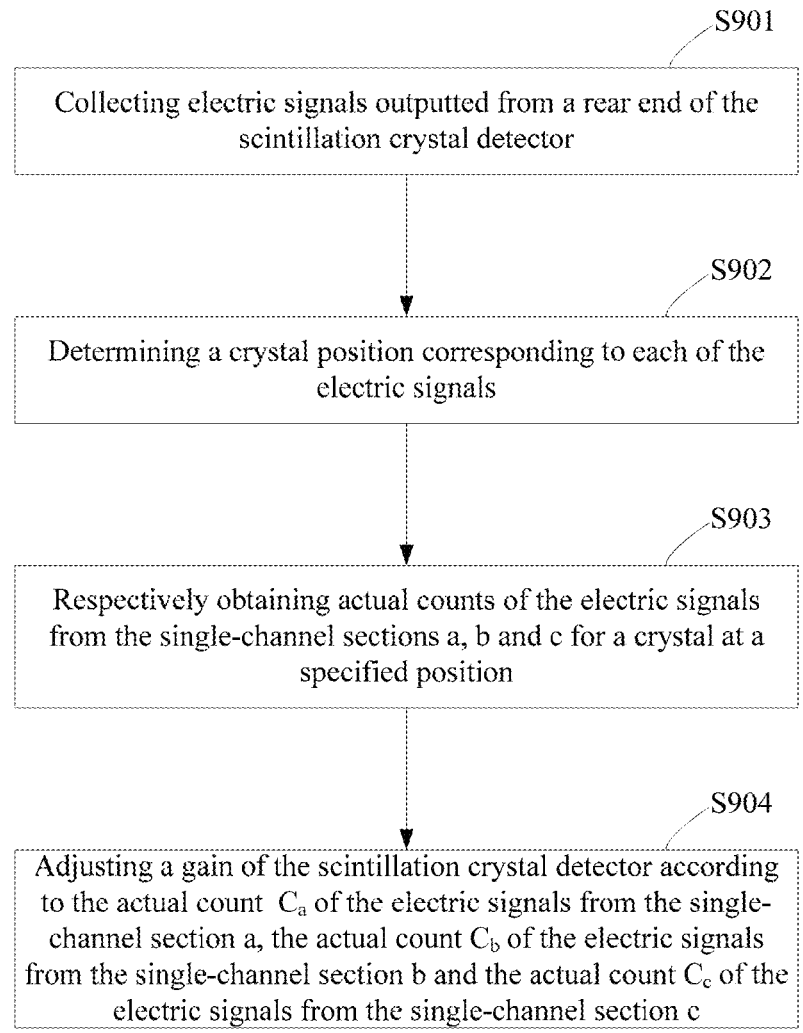
FIG. 9 is a flowchart illustrating procedures of a method of calibrating a gain of a scintillator detector according to a $2^{nd}$ example of the present disclosure.

In the $2^{nd}$ example, the counts of three single-channel sections may be adopted for calibrating a gain, wherein these three single-channel sections are denoted as a, b and c, respectively. FIG. 9 is a flowchart illustrating the procedures of a method of calibrating a gain of a scintillator detector according to a $2^{nd}$ example of the present disclosure. As shown in FIG. 9, the method of calibrating a gain may include the following blocks S901-S904.

At block S901, electric signals outputted from a rear end of the scintillator detector are collected.

The block S901 may be the same as the block S501 in the $1^{st}$ example, and detailed description is omitted for brevity.

At block S902, a crystal position corresponding to each of the electric signals is determined.

The block S902 may be the same as the block S502 in the $1^{st}$ example, and detailed description is omitted for brevity.

At block S903, actual counts of the electric signals from the single-channel sections a, b and c of a crystal at a specified position are respectively obtained.

According to a specific example, at the block S903, the actual count $C_a$ of the electric signals from the single-channel section a, the actual count $C_b$ of the electric signals from the single-channel section b, and the actual count $C_c$ of the electric signals from the single-channel section c at of a crystal a specified position may be respectively obtained.

At block S904, a gain of the scintillator detector is adjusted according to the actual count $C_a$ of the electric signals from the single-channel section a, the actual count $C_b$ of the electric signals from the single-channel section b, and the actual count $C_c$ of the electric signals from the single-channel section c.

Figure 10:
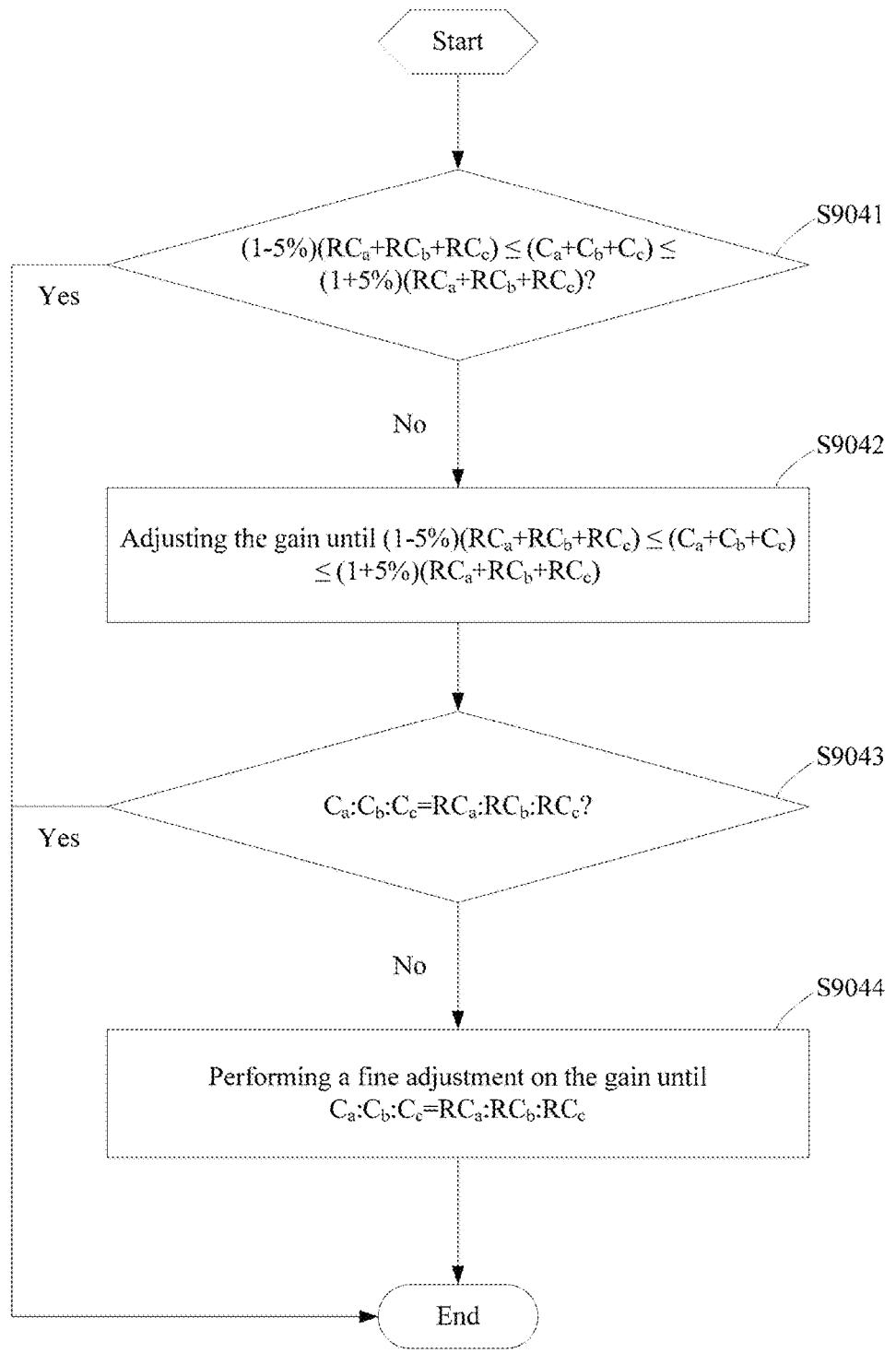
FIG. 10 is a flowchart illustrating a specific implementation of block S904 shown in FIG. 9.

As a specific example of the present disclosure, the specific implementation of the block S904 may be shown in FIG. 10, which may include the following blocks S9041-S9042.

At block S9041, whether a sum of the actual count $C_a$ of the electric signals from the single-channel section a, the actual count $C_b$ of the electric signals from the single-channel section b, and the actual count $C_c$ of the electric signals from the single-channel section c is within a threshold range for a sum of reference counts of the electric signals from the single-channel sections a, b and c is determined. If yes, it means that the current gain may be appropriate, so that the actual counts of the electric signals is within an acceptable range and gain adjustment is not required. If no, then the procedures go to the block S9042.

It should be noted that the threshold range for the sum of the reference counts of the electric signals from the single-channel sections a, b and c may be determined according to the reference counts $RC_a$, $RC_b$ and $RC_c$ of the electric signals from the single-channel sections a, b and c. Under normal circumstances, the threshold range for the sum of the reference counts $RC_a$, $RC_b$ and $RC_c$ of the electric signals from the single-channel sections a, b, and c may be a range obtained based on the sum of the reference counts $RC_a$, $RC_b$ and $RC_c$ of the electric signals from the single-channel sections a, b and c plus or minus (+/−) a certain floating extent. In this example, the certain floating extent may be 5%. At this time, the threshold range for the sum of the reference counts of the electric signals from the single-channel sections a, b and c may be $(1\pm5\%)(RC_a+RC_b+RC_c)$.

As mentioned above, in this example of the present disclosure, reference counts $RC_a$, $RC_b$ and $RC_c$ of the three single-channel sections a, b and c are 50 cps, 100 cps and 150 cps, respectively. $RC_a+RC_b+RC_c=50+100+150=300$ (cps). At this time, the threshold range for the sum of the reference counts of the electric signals from the single-channel sections a, b and c may be 300 cps±15 cps.

At block S9042, the gain of the scintillator detector is adjusted until the sum of the actual counts of the electric signals from the single-channel sections a, b and c is within the threshold range for the sum of the reference counts of the electric signals from the single-channel sections a, b and c.

In an example, in a case the sum of the actual count $C_a$ of the electric signals from the single-channel section a, the actual count $C_b$ of the electric signals from the single-channel section b, and the actual count $C_c$ from the electric signals of the single-channel section c is smaller than a lower limit of the threshold range for the sum of the reference counts of the electric signals from the single-channel sections a, b and c (i.e., $(C_a+C_b+C_c)<(1-5\%)(RC_a+RC_b+RC_c)$), the gain may be increased in accordance with a count-based gain adjustment table until the sum of the actual counts $C_a$, $C_b$ and $C_c$ of the electric signals from the single-channel sections a, b and c is within the threshold range for the sum of the reference counts $RC_a$, $RC_b$ and $RC_c$ of the electric signals from the single-channel sections a, b and c.

In another example, in a case the sum of the actual count $C_a$ of the electric signals from the single-channel section a, the actual count $C_b$ of the electric signals from the single-channel section b, and the actual count $C_c$ of the electric signals from the single-channel section c is greater than an upper limit of the threshold range for the sum of the reference counts of the electric signals from the single-channel sections a, b and c (i.e., $(C_a+C_b+C_c)>(1+5\%)(RC_a+RC_b+RC_c)$), the gain may be decreased in accordance with a count-based gain adjustment table until the sum of the actual counts $C_a$, $C_b$ and $C_c$ of the electric signals from the single-channel sections a, b and c is within the threshold range for the sum of the reference counts $RC_a$, $RC_b$ and $RC_c$ of the electric signals from the single-channel sections a, b and c.

In another example, in a case the sum of the actual count $C_a$ of the electric signals from the single-channel section a, the actual count $C_b$ of the electric signals from the single-channel section b, and the actual count $C_c$ of the electric signals from the single-channel section c is within the threshold range for the sum of the reference counts of the electric signals from the single-channel sections a, b and c (i.e., $(1-5\%)(RC_a+RC_b+RC_c) \le (C_a+C_b+C_c) \le (1+5\%)(RC_a+RC_b+RC_c)$), the actual counts of the electric signals are within an acceptable range, so the gain of the scintillator detector won't be adjusted.

Be noted that, the count-based gain adjustment table of the scintillator detector may be obtained from experiments. Different types of scintillator detectors may have different count-based gain adjustment tables. According to an example of the present disclosure, in a case the sum $(RC_a+RC_b+RC_c)$ of the reference counts of the electric signals from the single-channel sections a, b and c is equal to 300 cps, the count-based gain adjustment table of the scintillator detector may be shown as Table-3 below.

TABLE 3

The count-based gain adjustment table

| $(RC_a + RC_b + RC_c) - (C_a + C_b + C_c)$ | | | | | | | |
|---|---|---|---|---|---|---|---|
| | ... −50 cps | −40 cps | −20 cps | 0 cps | 20 cps | 40 cps | ... |
| Gain Adjustment Ratio | ... −10% | −6% | −3% | 0 | 3% | 6% | ... |

The meaning of the count-based gain adjustment table shown in Table-3 is basically the same as Table-1 in the $1^{st}$ example, and detailed description is omitted for brevity.

Be noted that, the rough adjustment for the gain of the scintillator detector may be substantially realized by the blocks S9041 and S9042. In order to make the corrected gain of the scintillator detector more accurately, the method for calibrating a gain provided in the example of the present disclosure may further perform a fine adjustment based on the result of above-described rough adjustment. In this case, the block S904 may further include the blocks S9043-S9044 below.

At block S9043, whether a ratio between the actual count $C_a$ of the electric signals from the single-channel section a, the actual count $C_b$ of the electric signals from the single-channel section b, and the actual count $C_c$ of the electric signals from the single-channel section c is consistent with a ratio between the reference count $RC_a$ of the electric signals from the single-channel section a, the reference count $RC_b$ of the electric signals from the single-channel section b, and the reference count $RC_c$ of the electric signals from the single-channel section c (hereinafter is referred to as a reference count ratio) is determined. If yes, it means that the current gain may be appropriate, so that gain adjustment is not required. If no, then go to the block S9044.

At block S9044, a fine adjustment is performed on the gain of the scintillator detector until the ratio of the actual counts of the electric signals from the single-channel sections a, b and c is consistent with the ratio of the reference counts of the electric signals from the single-channel sections a, b, and c.

For example, in a case $C_a:C_b:C_c < RC_a:RC_b:RC_c$, it means that the current gain of the scintillator detector is too small. At this time, the gain of the scintillator detector may be increased in accordance with the count-ratio-based gain adjustment table until $C_a:C_b:C_c = RC_a:RC_b:RC_c$.

On the other hand, in a case $C_a:C_b:C_c > RC_a:RC_b:RC_c$, it means that the current gain of the scintillator detector is too large. At this time, the gain of the scintillator detector may be decreased in accordance with the count-ratio-based gain adjustment table until $C_a:C_b:C_c = RC_a:RC_b:RC_c$.

In another example, in a case $C_a:C_b:C_c = RC_a:RC_b:RC_c$, it means that the current gain is appropriate, so that gain adjustment for the scintillator detector is not required.

Figure 11:
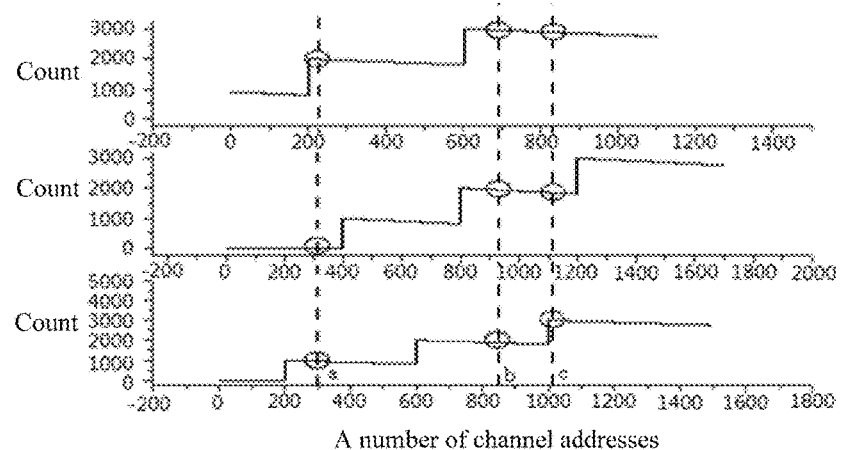
FIG. 11 is a diagram showing multiple single-channel ratios according to the $2^{nd}$ example of the present disclosure.

FIG. 11 is a diagram showing three cases that the scintillator detector has a too small gain, a too large gain, and an appropriate gain, wherein the upper part of FIG. 11 shows the case that the scintillator detector has a too small gain, the central part of FIG. 11 shows the case that the scintillator detector has a too large gain, and the lower part of FIG. 11 shows the case that the scintillator detector has an appropriate gain.

Under normal circumstances, a normalization may be performed on the ratio of the reference counts of the single-channel sections a, b and c in order to obtain the following proportional relationship: $RC_a:RC_b:RC_c=1:x:y$. In this example, $RC_a:RC_b:RC_c=1:2:3$.

If a normalization is also performed on the ratio of the actual counts of the single-channel sections a, b and c, the following proportional relationship may be obtained: $C_a:C_b:C_c=1:x':y'$. In a case $z=x:y=0.67$ and $z'=x':y'$, only the magnitudes of z and z' need to be compared.

For example, in a case z'<z, the gain of the scintillator detector may be increased in accordance with the count-ratio-based gain adjustment table until z'=z. In a case z'>z, the gain of the scintillator detector may be decreased in accordance with the count-ratio-based gain adjustment table until z'=z. In a case z'=z, it means that calibrating a gain for the scintillator detector is not required.

As an example of the present disclosure, the count-ratio-based gain adjustment table of the scintillator detector may be shown as Table-4 below.

TABLE 4

The count-ratio-based gain adjustment table

| | $(z' - z)/z$ | | | | | | |
|---|---|---|---|---|---|---|---|
| | ... −3% | −2% | −1% | 0 | 1% | 2% | 3% ... |
| Gain Adjustment Ratio | ... −5% | −3% | −1% | 0 | 1% | 2% | 5% ... |

The meaning of the count-ratio-based gain adjustment table shown in Table-4 is basically the same as Table-2 in the $1^{st}$ example, and detailed description is omitted for brevity.

Above is a specific embodiment of a method for calibrating a gain of a scintillator detector provided in the $2^{nd}$ example of the present disclosure.

Be noted that, the counts of three single-channel sections are adopted in the method for calibrating a gain mentioned in the $2^{nd}$ example. In practice, as an extension of the example of the present disclosure, the counts of three energy regions may be adopted in the method of calibrating a gain. For example, the counts of the three energy regions A, B and C may be adopted in the method of calibrating a gain. The method adopting the counts of three energy regions for calibrating is similar to the method adopting the counts of three single-channel sections for calibrating, wherein the above-described three single-channel sections may be accordingly replaced with the three energy regions.

Be noted that, the method of calibrating a gain provided in the examples of the present disclosure is not limited to the above-described single-channel sections a, b and c or the energy regions A, B and C. In practice, for the LYSO crystal, any three energy regions among the four energy regions of the LYSO crystal or any three single-channel sections of any three energy regions among the four energy regions of the LYSO crystal may be selected for achieving the purpose of calibrating a gain of the scintillator detector.

As an extension of the example of the present disclosure, the counts of single-channel sections corresponding to all energy regions (i.e., four energy regions) of the LYSO crystal may be adopted in the method of calibrating a gain of the scintillator detector provided in the example of the present disclosure. The method adopting the counts of the single-channel sections corresponding to the four energy regions for calibrating is similar to the method adopting the counts of two single-channel sections or three single-channel sections for calibrating, and detailed description is omitted for brevity.

In summary, the counts of two single-channel sections or two energy regions, or the counts of three single-channel sections or three energy regions, or the counts of four or more single-channel sections or four or more energy regions may be adopted in the method of calibrating a gain of the scintillator detector provided in the example of the present disclosure.

Since the ratio between different single-channel sections or different energy regions needs to be calculated during the calibration process, the counts of at least two single-channel sections or at least two energy regions may be adopted in the method of calibrating a gain of the scintillator detector provided in the example of the present disclosure.

Be noted that, in both the $1^{st}$ example and the $2^{nd}$ example, the scintillator detector uses its internal scintillation crystal as the radiation source for calibrating. In practice, the method of calibrating a gain provided in the example of the present disclosure may also adopt an external radiation source for calibrating. No matter the internal scintillation crystal of the scintillator detector or the external radiation source is adopted as the radiation source, the radiation source must have the following characteristics: the background spectrum having two or more energy regions, which can emit at least two rays with different energies.

Figure 12:
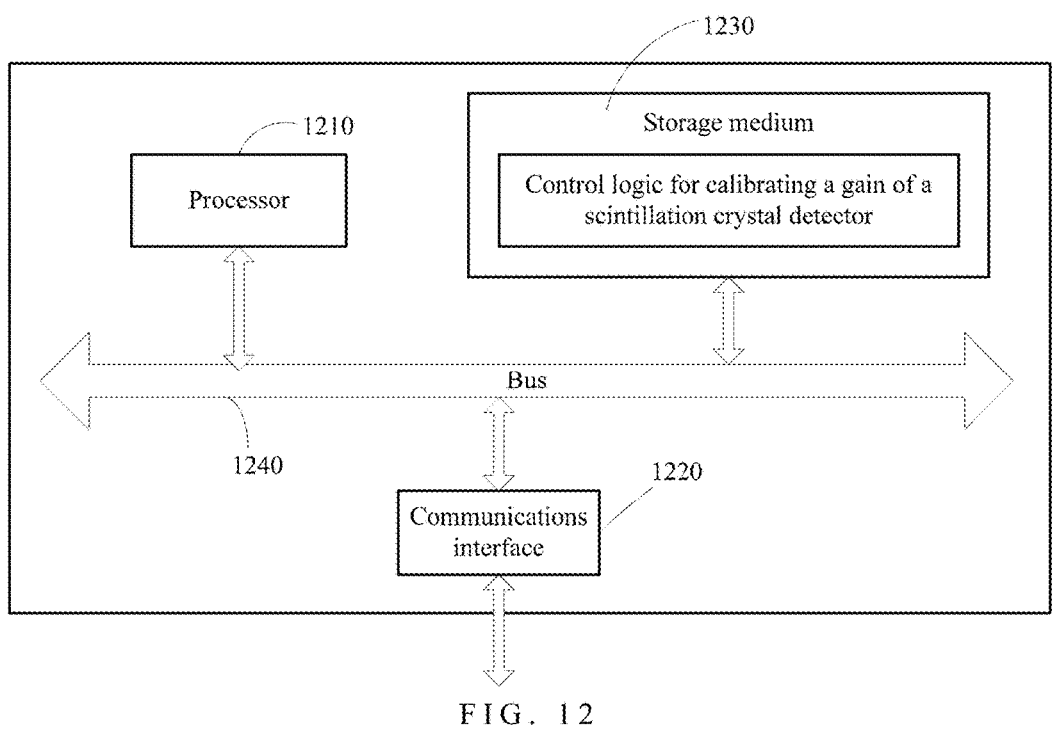
FIG. 12 is a hardware architecture diagram of a control device for performing a method of calibrating a gain of a scintillator detector according to an example of the present disclosure.

The method of calibrating a gain of the scintillator detector in the examples above may be executed by a control device shown in FIG. 12. FIG. 12 is a hardware architecture diagram of a control device for performing a method of calibrating a gain of a scintillator detector according to an example of the present disclosure. The control device shown in FIG. 12 may include a processor 1210, a communications interface 1220, a storage medium 1230, and a bus 1240, wherein the processor 1210, the communications interface 1220, and the storage medium 1230 are communicated to each other through the bus 1240.

In an example, the storage medium 1230 is used for storing machine readable instructions corresponding to a control logic for calibrating a gain of a scintillator detector, wherein the storage medium 1230 may be a non-volatile memory. The processor 1210 may invoke machine readable instructions corresponding to a control logic for calibrating a gain of a scintillator detector and execute the machine readable instructions to execute the above-described method for calibrating a gain of the scintillator detector. For example, the machine readable instructions corresponding to a control logic for calibrating a gain of a scintillator detector may be programs corresponding to control software. In a case the processor 1210 executes the machine readable instructions, the control device may accordingly display a function interface corresponding to the machine readable instructions on a display screen.

In a case the function of the machine readable instructions corresponding to a control logic for calibrating a gain of a scintillator detector is implemented by a software function unit and is used as a standalone product for sale or for use, it may be stored in a computer readable storage medium. Based on such understanding, a technical scheme of the present disclosure or a part of said technical scheme contributed to the prior art or a part of said technical scheme may be embodied in the form of a software product, and the computer software product is stored in a storage medium, which may include several instructions for instructing a computer device (such as, a personal computer, a server, or a network equipment, etc.) to execute all or a part of the blocks of the methods in various examples of the present disclosure. The above-described storage medium may include: USB Flash Drive, Removable Hard Disk, Read-Only Memory (ROM), Random Access Memory (RAM), Floppy Disk, or CD-ROM, or similar storage medium capable of storing program codes, or a combination thereof.

The above-described machine readable instructions corresponding to a control logic for calibrating a gain of a scintillator detector may be called "a device for calibrating a gain of a scintillator detector", wherein the device for calibrating a gain may be divided into a plurality of functional modules according to functions of the device.

Please refer to a $3^{rd}$ example for specific implementations.

In the $3^{rd}$ example, the background spectrum of the radiation source adopted by the device for calibrating a gain may include two or more energy regions, which may emit at least two rays with different energies.

Figure 13:
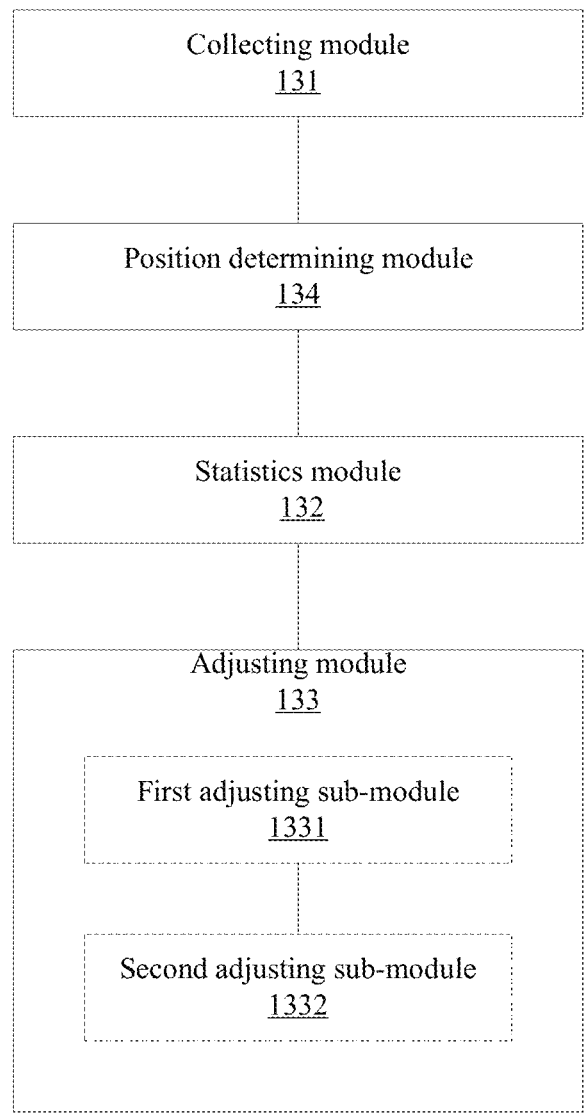
FIG. 13 is a block diagram of a control logic for calibrating a gain of a scintillator detector according to an example of the present disclosure.

FIG. 13 is a block diagram of a control logic for calibrating a gain of a scintillator detector according to a $3^{rd}$ example of the present disclosure. As shown in FIG. 13, the control logic may include a collecting module 131, a statistics module 132, and an adjusting module 133.

The collecting module 131 is used for collecting electric signals outputted from a rear end of the scintillator detector.

The statistics module 132 is used for respectively obtained actual counts of the electric signals from at least two energy regions of the scintillation crystal at a specified position.

The adjusting module 133 is used for adjusting a gain of the scintillator detector according to the actual counts of the electric signals from said at least two energy regions.

In another example, the control logic may further include a crystal position determining module 134 in order to determine the electric signals are outputted from which crystal. The crystal position determining module 134 is used for determining a crystal position corresponding to each of the electric signals after collecting the electric signals outputted from the rear end of the scintillator detector and before respectively obtaining actual counts of the electric signals from at least two energy regions of the scintillation crystal at a specified position.

Be noted that, in a case the scintillator detector adopting the form of a photoelectric conversion element corresponding to a scintillation crystal, the control logic provided in the present disclosure may not be equipped with the crystal position determining module 134. In this case, the position of each photoelectric conversion element itself represents the crystal position.

However, under normal circumstances, in order to save photoelectric conversion elements, the scintillator detector may adopt a few photoelectric conversion elements to match with dozens of scintillation crystals, and the electric signals at rear end may adopt gravity method to restore position information or other information of original signals through splitting effects of light guides. For example, in a case the scintillator detector adopts a few photoelectric conversion elements to match with dozens of scintillation crystals, a crystal position corresponding to each of the electric signals may need to be determined. In this case, the control logic provided in the present disclosure may include the crystal position determining module 134.

In a specific example of the present disclosure, the adjusting module 133 may specifically include a first adjusting sub-module 1331. The first adjusting sub-module 1331 is used for determining whether a sum of the actual counts of said at least two energy regions is within a threshold range for a sum of reference counts of said at least two energy regions; if no, the gain of the scintillator detector is adjusted until the sum of the actual counts of said at least two energy regions is within the threshold range for the sum of the reference counts of said at least two energy regions; if yes, the further adjusting the gain of the scintillator detector is not required.

In another example of the present disclosure, in order to make the corrected gain of the scintillator detector more accurately, the adjusting module 133 may further include a second adjusting sub-module 1332. The second adjusting sub-module 1332 is used for determining whether a ratio of the actual counts of said at least two energy regions is consistent with a ratio of the reference counts of said at least two energy regions if the sum of the actual counts of said at least two energy regions is within the threshold range for the sum of the reference counts of said at least two energy regions; if no, a fine adjustment is performed on the gain of the scintillator detector until the ratio of the actual counts of said at least two energy regions is consistent with the ratio of the reference counts of said at least two energy regions; if yes, further adjustment is not required.

In an example of the present disclosure, in a case a scintillation crystal of the scintillator detector has a long-life background radioactivity and is able to emit at least two different radiation rays with different energies, the scintillator detector may adopt its own scintillation crystal as the radiation source, such that the external radiation source and motif system are not required for the device for calibrating a gain.

In an example of the present disclosure, each of the energy regions may include at least one single-channel section, and the single-channel section may include at least one channel address. The statistics module 132 is specifically used for respectively obtaining actual counts of electric signals from at least two single-channel sections of the scintillation crystal at a specified position, wherein each of said at least two single-channel sections belongs to different energy regions, respectively.

In an example of the present disclosure, the scintillation crystal of the scintillator detector may be a Lutetium-yttrium oxyorthosillicate Crystal, namely a LYSO crystal.

In an example of the present disclosure, the background spectrum of the LYSO crystal may include four different energy regions, wherein said at least two energy regions may be the two energy regions having lower channel addresses.

In another example of the present disclosure, the background spectrum of the LYSO crystal may include four different energy regions, wherein said at least two energy regions may be any two energy regions among these four different energy regions.

The above are only preferred examples of the present disclosure is not intended to limit the disclosure within the spirit and principles of the present disclosure, any changes made, equivalent replacement, or improvement in the protection of the present disclosure should contain within the range.

The methods, processes and units described herein may be implemented by hardware (including hardware logic circuitry), software or firmware or a combination thereof. The term 'processor' is to be interpreted broadly to include a processing unit, ASIC, logic unit, or programmable gate array etc. The processes, methods and functional units may all be performed by the one or more processors; reference in this disclosure or the claims to a 'processor' should thus be interpreted to mean 'one or more processors'.

Further, the processes, methods and functional units described in this disclosure may be implemented in the form of a computer software product. The computer software product is stored in a storage medium and comprises a plurality of instructions for making a processor to implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts described show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

For simplicity and illustrative purposes, the present disclosure is described by referring mainly to an example thereof. In the above description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

As used herein, the terms "a" and "an" are intended to denote at least one of a particular element, the term "includes" means includes but not limited to, the term "including" means including but not limited to, and the term "based on" means based at least in part on. Throughout the present disclosure, the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Accordingly, other embodiments are within the scope of the following claims.

The invention claimed is:

1. A method of calibrating a gain of a scintillator detector, the method comprising:
    collecting electric signals outputted from a rear end of a scintillator detector when a scintillation crystal of the scintillator detector is adopted as a radiation source for calibrating, a background spectrum of the scintillation crystal including two or more energy regions;
    obtaining respective actual counts of the electric signals from each of at least two energy regions of the scintillation crystal, the scintillation crystal being at a specified position; and
    adjusting a gain of the scintillator detector according to the obtained actual counts of the electric signals from the at least two energy regions,
    wherein adjusting the gain of the scintillator detector according to the obtained actual counts of the electric signals from the at least two energy regions comprises:
        determining whether a sum of the actual counts of the at least two energy regions is within a threshold range for a sum of reference counts of the at least two energy regions,
        in response to a determination of the sum of the actual counts of the at least two energy regions being not within the threshold range, adjusting the gain of the scintillator detector such that the sum of the actual counts of the at least two energy regions is within the threshold range,
        in response to a determination of the sum of the actual counts of the at least two energy regions being within the threshold range, determining whether a ratio of the actual counts of the at least two energy regions is consistent with a ratio of the reference counts of the at least two energy regions, and
        in response to a determination of the ratio of the actual counts being not consistent with the ratio of the reference counts, adjusting the gain of the scintillator detector such that the ratio of the actual counts of the at least two energy regions is consistent with the ratio of the reference counts of the at least two energy regions.

2. The method of claim 1, wherein the scintillation crystal of the scintillator detector has a long-life background radioactivity.

3. The method of claim 2, wherein the scintillation crystal comprises a Lutetium-yttrium oxyorthosillicate Crystal.

4. The method of claim 1, wherein the scintillator detector comprises:
    a plurality of scintillation crystals positioned on a front end of the scintillator detector and configured to receive nuclear radiation, each of the scintillation crystals having two or more energy regions; and
    a plurality of photoelectric convertor positioned on the rear end of the scintillator detector and configured to match with the plurality of scintillation crystals and obtain corresponding electric signals for the plurality of scintillation crystals.

5. The method of claim 4, further comprising:
    determining a crystal position corresponding to each of the collected electric signals which are outputted from the rear end of the scintillator detector,
    wherein the specified position is the determined crystal position for the scintillation crystal.

6. The method of claim 5, further comprising:
    adjusting the gain of the scintillator detector according to obtained actual counts of electric signals from at least two energy regions of a second scintillation crystal of the plurality of scintillation crystals at a second determined crystal position for the second scintillation crystal.

7. The method of claim 1, wherein
    each energy region of the background spectrum of the scintillation crystal comprises one or more single-channel sections, and
    each of the single-channel sections comprises at least one channel address.

8. The method of claim 1, wherein
    the at least two energy regions of the scintillation crystal at the specified position comprise at least two single-channel sections of the scintillation crystal, and
    each of the at least two single-channel sections belongs to a respective, different energy region.

9. A device for calibrating a gain of a scintillator detector, the device comprising:
    a processor which invokes machine readable instructions corresponding to a control logic for calibrating a gain of a scintillator detector stored on a storage medium and executes the machine readable instructions to:
        collect electric signals outputted from a rear end of the scintillator detector when a scintillation crystal of the scintillator detector is adopted as a radiation source for calibrating, a background spectrum of the scintillation crystal including two or more energy regions;
        obtain respective actual counts of the electric signals from each of at least two energy regions of the scintillation crystal, the scintillation crystal being at a specified position; and
        adjust a gain of the scintillator detector according to the actual counts of the electric signals from the at least two energy regions,
    wherein, for adjusting a gain of the scintillator detector according to the actual counts of the electric signals from the at least two energy regions, the machine readable instructions further cause the processor to:
        determine whether a sum of the actual counts of said at least two energy regions is within a threshold range for a sum of reference counts of said at least two energy regions;
        in response to a determination of the sum of the actual counts of the at least two energy regions being not within the threshold range, adjust the gain of the scintillator detector such that the sum of the actual counts of the at least two energy regions is within the threshold range;
        in response to a determination of the sum of the actual counts of the at least two energy regions being within the threshold range, determine whether a ratio of the actual counts of the at least two energy regions is consistent with a ratio of the reference counts of the at least two energy regions; and
        in response to a determination of the ratio of the actual counts is not consistent with the ratio of the reference counts, adjust the gain of the scintillator detector such that the ratio of the actual counts of the at least two energy regions is consistent with the ratio of the reference counts of the at least two energy regions.

10. The device of claim 9, wherein the scintillation crystal of the scintillator detector has a long-life background radioactivity.

11. The device of claim 10, wherein the scintillation crystal comprises a Lutetium-yttrium oxyorthosillicate Crystal.

12. The device of claim 9, wherein the scintillator detector comprises:
   a plurality of scintillation crystals positioned on a front end of the scintillator detector and configured to receive nuclear radiation, each of the scintillation crystals having two or more energy regions; and
   a plurality of photoelectric convertor positioned on the rear end of the scintillator detector and configured to match with the plurality of scintillation crystals and obtain corresponding electric signals for the plurality of scintillation crystals.

13. The device of claim 12, wherein the machine readable instructions further cause the processor to:
   determine a crystal position corresponding to each of the collected electric signals which are outputted from the rear end of the scintillator detector,
   wherein the specified position is the determined crystal position for the scintillation crystal.

14. The device of claim 13, wherein the machine readable instructions further cause the processor to:
   adjust the gain of the scintillator detector according to obtained actual counts of electric signals from at least two energy regions of a second scintillation crystal of the plurality of scintillation crystals at a second determined crystal position for the second scintillation crystal.

15. The device of claim 9, wherein
   each energy region of the background spectrum of the scintillation crystal comprises one or more single-channel sections, and
   each of the single-channel sections comprises at least one channel address.

16. The device of claim 15, wherein
   the at least two energy regions of the scintillation crystal at the specified position comprise at least two single-channel sections of the scintillation crystal,
   each of the at least two single-channel sections belongs to a respective, different energy region.

* * * * *